(12) United States Patent
Blair et al.

(10) Patent No.: US 12,321,517 B2
(45) Date of Patent: Jun. 3, 2025

(54) WEARABLE REMOTE CONTROLLER

(71) Applicant: Sportrax Technology Ltd, London (GB)

(72) Inventors: Paul Blair, London (GB); Nik Kostaras, Melissia (GR); Senthil Kumar Balasubramanian, Princes Risborough (GB)

(73) Assignee: Sportrax Technology Ltd, London (GB)

( * ) Notice: Subject to any disclaimer, the term of this patent is extended or adjusted under 35 U.S.C. 154(b) by 0 days.

(21) Appl. No.: 18/261,148

(22) PCT Filed: Jan. 5, 2022

(86) PCT No.: PCT/GB2022/050007
§ 371 (c)(1),
(2) Date: Jul. 12, 2023

(87) PCT Pub. No.: WO2022/153032
PCT Pub. Date: Jul. 21, 2022

(65) Prior Publication Data
US 2024/0281064 A1    Aug. 22, 2024

Related U.S. Application Data

(60) Provisional application No. 63/137,544, filed on Jan. 14, 2021.

(51) Int. Cl.
*G06F 3/01* (2006.01)
*G06F 3/0338* (2013.01)

(52) U.S. Cl.
CPC ............ *G06F 3/014* (2013.01); *G06F 3/0338* (2013.01)

(58) Field of Classification Search
CPC .............................. G06F 3/014; G06F 3/0338
See application file for complete search history.

(56) References Cited

U.S. PATENT DOCUMENTS 8,570,273 B1 * 10/2013 Smith ................. G06F 3/03547
345/161
2006/0164383 A1 * 7/2006 Machin ................. G06F 3/0338
345/156

(Continued)

OTHER PUBLICATIONS

Search Report and Written Opinion issued for International Patent Application No. PCT/GB2022/050007, dated May 4, 2022, ISA/EP, 8 pages.

*Primary Examiner* — Ryan A Lubit
(74) *Attorney, Agent, or Firm* — Haynes and Boone, LLP; Mark A. Tidwell

(57) ABSTRACT

The present disclosure relates to a wearable electronic controller for remotely controlling an external electronic device. The controller comprises a body configured to fit on a human finger, and a multi-directional switch. The multi-directional switch comprises: a lever that extends outwardly from an outer surface of the body, and a control unit configured generate input signals in response to manipulation of the lever. The controller further comprises circuitry configured to generate command signals based on the input signals, and to wirelessly transmit the command signals to the external electronic device, wherein the generated command signals are for causing respective actions to be performed at the external electronic device.

20 Claims, 9 Drawing Sheets

(56) References Cited

U.S. PATENT DOCUMENTS

| | | | | |
|---|---|---|---|---|
| 2014/0347278 | A1* | 11/2014 | Zhou | G06F 1/169 |
| | | | | 345/161 |
| 2015/0133193 | A1* | 5/2015 | Stotler | G06F 15/0216 |
| | | | | 455/557 |
| 2015/0217204 | A1* | 8/2015 | Howard | A63F 13/245 |
| | | | | 446/484 |
| 2015/0277559 | A1* | 10/2015 | Vescovi | G06F 3/017 |
| | | | | 345/173 |
| 2016/0116981 | A1* | 4/2016 | Mortazavi | G06F 3/03549 |
| | | | | 345/184 |
| 2017/0090590 | A1* | 3/2017 | Shimotono | G04G 21/00 |
| 2017/0113132 | A1* | 4/2017 | Mortazavi | A63F 13/24 |
| 2017/0330471 | A1* | 11/2017 | Subiakto | G11B 33/025 |
| 2018/0292901 | A1* | 10/2018 | Priyantha | G06F 3/041 |
| 2019/0067968 | A1* | 2/2019 | Guo | G06F 1/163 |
| 2019/0190214 | A1* | 6/2019 | Choi | G06F 1/163 |
| 2020/0110457 | A1* | 4/2020 | Mak-Fan | G06F 1/329 |
| 2020/0118420 | A1* | 4/2020 | Griffin | G06F 3/014 |
| 2020/0390343 | A1* | 12/2020 | Felix | A61B 5/443 |

* cited by examiner

WEARABLE REMOTE CONTROLLER

CROSS REFERENCE TO RELATED APPLICATION

The present application is a U.S. National Stage patent application of International Patent Application No. PCT/GB2022/050007 entitled "Wearable Remote Controller," filed on Jan. 5, 2022, which claims priority to U.S. Provisional Patent Application No. 63/137,544, filed on Jan. 14, 2021, the disclosures of which are hereby incorporated by reference.

FIELD OF THE INVENTION

The present invention relates generally to portable electronic devices and mobile devices. More specifically, the present invention provides a ring-shaped or annular electronic controller that allows a user to remotely control electronic devices, such as smartphones, music speakers, laptops, or any other electronic devices capable of being remotely controlled.

BACKGROUND OF THE INVENTION

Mobile devices such as cell phones, smartphones, music players, speakers, and sports cameras are increasingly used in everyday activities. To interact with mobile devices, users have to stop their activity and focus on the device and its on-screen user interface, or on the limited physical buttons on the device. This might distract the user from their activity, which might lead to safety concerns. For example, in sporting and fitness environments, mobile devices are often used in conjunction with headphones, and other accessories to perform functionalities such as listening to music, changing the volume or skipping music tracks as well as hands-free calling, the operation of speakers and sports cameras. When taking part in outdoor activities such as skiing, mountain biking or kayaking, the user typically stores their smartphone within their protective clothing. To operate the device the user typically has to stop their activity, and remove a glove to retrieve the device before being able to operate it. Similarly, if using an item of indoor sporting equipment such as a rowing machine or cross trainer, the user must typically take a hand of the equipment to locate and operate their smartphone or other mobile device. There are also military and healthcare applications where it might be dangerous for a user to lose focus on the current activity to control an auxiliary device.

SUMMARY OF THE INVENTION

An objective of the present invention is to provide an electronic controller that is sized to be worn as a ring on the index finger of the user. A micro joystick lever projects outwardly from the ring housing and is positioned to be manipulated by the user's thumb. The controller is in bidirectional wireless communication with an external electronic device. The joystick lever can be manipulated to perform functions or actions at a remote/external electronic device. The present invention allows the user to focus on their main task, interact with the remote device when needed and switch back to their original task without having to retrieve the remote device or hold it in their hand, and thus minimizing the disruption of the main task. Additional features and benefits are further discussed in the sections below.

In some embodiments, using intelligent context aware processing, the controller can be used to control a variety of software applications that may run on the remote device.

According to a first aspect of the present invention, there is provided a wearable electronic controller for remotely controlling an external electronic device, comprising:
- a body configured to fit on a human finger, optionally wherein the body is annular;
- a multi-directional switch comprising: a lever that extends outwardly from an outer surface of the body, and a control unit configured generate input signals in response to manipulation of the lever; and
- circuitry configured to generate command signals based on the input signals, and to wirelessly transmit the command signals to the external electronic device, wherein the generated command signals are for causing respective actions to be performed at the external electronic device.

Advantageously, a user can use the controller to control the external device, without diverting their attention from their current task. Moreover the user can perform a control action on the electronic device, without having to use their hands to hold and control the device. Rather, the user can use their thumb of the same hand to operate the multi-directional switch (i.e. joystick) lever, and therefore can use the controller even when their hands are occupied (e.g. whilst holding ski poles, bicycle handles or otherwise). As such, the controller can be operated with a single hand whilst that hand is occupied.

In exemplary embodiments, the body comprises a housing containing at least the control unit and the circuitry. Advantageously, the circuitry and componentry of the controller is held in the same location, allowing for a compact and more shock proof design of the controller.

In exemplary embodiments, the housing is removeable or detachable from the body. Advantageously, the controller has a modular design, and the main circuitry of the controller can be removed from the body and inserted into different bodies. This allows the user to continue using the controller after the body is worn or damaged. Moreover, different bodies can be used without having to replace the main circuitry, depending on the user's finger sizes.

In exemplary embodiments, the lever extends outwardly from the housing; and the body comprises a cavity or compartment for receiving the housing, and a hole in the outer surface of the body, the hole being positioned to receive the lever therethrough when the housing is received in the cavity, such that the lever extends above the outer surface of the body when the housing is in the cavity. Optionally the housing and/or the body comprises a mechanism configured to releasably hold the housing within the cavity. Such embodiments illustrate how the separate components of the body and the housing may be provided together in a compact, safe and shockproof manner, whilst ensuring that the joystick lever is accessible to the user during use.

In exemplary embodiments, the housing is configured to be at least partially waterproof to protect at least the circuitry from water ingress. Advantageously, the controller can be used underwater or in wet conditions without sustaining damage to the circuitry within the housing. In some examples, the housing can be formed of a base tray and a top cover which are sealed in a watertight manner. Additionally or alternatively, the hole in the housing can be made waterproof by securing a waterproof membrane between the joystick and the hole.

In exemplary embodiments, the lever is movable between a plurality of discrete positions, and the control unit is configured to generate a discrete input signal for each discrete position. Advantageously, since there is only a discrete set of inputs available to the user, the controller is easier to use on the go and without needing to see the screen of the external electronic device.

In exemplary embodiments, the circuitry is configured to generate the command signals by:
- accessing a key-map, wherein the key-map is indicative of a predefined relationship between the input signals and a plurality of predefined actions, wherein the predefined actions are for controlling the external electronic device;
- determining, from the key-map, the predefined actions associated with the generated input signals; and
- generating command signals corresponding to the determined predefined actions, wherein the generated command signals are for causing the determined predefined actions to be performed at the external electronic device.

Advantageously, the controller can be used to perform a preprogrammed or predefined set of actions on the external electronic device.

In exemplary embodiments, the circuitry is configured to:
- receive, from the external electronic device, information indicative of a current context of the external electronic device;
- select the key-map from a plurality of key-maps based on the information indicative of the current context, wherein each key-map is associated with a different context of the external electronic device, and wherein each key-map is indicative of a predefined relationship between the input signals and a respective plurality of predefined actions;
- determine, from the selected key-map, the predefined actions associated with the generated input signals; and
- generate command signals corresponding to the determined predefined actions, wherein the generated command signals are for causing the determined predefined actions to be performed at the external electronic device.

Advantageously, the controller can be used within a variety of different contexts of the external device. A context of the external device may generally refer to a state of the device in which a certain predefined set of actions can be used to control certain functions of the device. Therefore, a current context of the external device may be associated with a certain set of predefined actions that can be used to control the device within that context. For example, a context may correspond to an application or program that is presently running in the foreground on the external electronic device. Different applications or programs may be associated with different sets of predefined actions that are for controlling said application or program. For example, a music player application may be associated with play/pause/skip forward/skip backward/volume-up/volume-down actions. However, these actions may not be suited for a video player or camera application, which may require different sets of actions. As such, the present invention may determine which application is presently running on the external device. For example an indication of the current context is sent to the controller. The controller may then select a key-map associated with that application. The key-map defines or maps out a relationship between the limited number of input signals that can be outputted by the joystick, and the actions for controlling the application (e.g. in the case of a music player application, play/pause/skip forward/skip backward/volume up/volume down actions). The key-map is then used to generate the command signals so that movement of the joystick generates command signals corresponding to the control actions for that particular application. When the foreground application changes, a different corresponding key-map is selected by the controller, and therefore the mapping of the joystick is updated dynamically. Advantageously, the joystick input device can be used with a number of different applications on the external device.

In exemplary embodiments, the circuitry is configured to receive the key-map from the external electronic device. Such embodiments can avoid the need to store key-maps locally on the controller and therefore can lead to reductions in the size of the local circuitry.

In exemplary embodiments, the body comprises a head portion and a shank portion that together define an inner circumference of the body, wherein the head portion and the shank portion differ in shape, wherein the lever extends outwardly from an outer surface of the head portion. Advantageously, by providing the lever on a differently shaped portion of the body, a user can more easily locate and use the lever on the go. For example, the user can use the different shape as guidance to locate the lever through touch, without having to look down at the controller.

In exemplary embodiments, the head portion has at least a first radial thickness between the inner circumference and the outer surface of the head portion, and the shank portion has a second radial thickness between the inner circumference and an outer surface of the shank portion, wherein the first radial thickness is greater than the second radial thickness. Advantageously, the location of the lever is raised with respect to the rest of the controller, making it easier to locate on the go.

In exemplary embodiments, the outer surface of the head portion has a lesser or smaller degree of curvature than an outer surface of the shank portion. Advantageously, the outer surface of the head portion is flatter than the shank portion, which allows the user to more easily locate the lever through touch.

In exemplary embodiments, the lever extends from an off-centre location on the outer surface of the head portion. For example, the head portion can comprise an axis of symmetry, wherein the lever extends from the outer surface of the head portion at a location away from the axis of symmetry. Advantageously, when the controller is worn, the lever can be located closer to the user's thumb, which results in a more ergonomic and easier to use controller. In particular, the user's thumb may more naturally fall on the lever making it easier to locate and use.

In exemplary embodiments, the head portion comprises the housing and/or the cavity. Advantageously, the circuitry and the joystick is held in the head portion, which allows for a more compact design.

In exemplary embodiments, the body is made of rubber, optionally wherein the rubber is a silicon rubber. Advantageously, the controller may have increased shock resistance and waterproof characteristics.

In exemplary embodiments, the controller further comprises a power supply unit configured to power at least the circuitry, and wherein any one or more of the following applies:
- the power supply is contained in the housing;
- the power supply comprises a rechargeable battery; and
- the housing contains means for receiving power to wirelessly charge the battery.

Advantageously, the controller can be used wirelessly and on the go without requiring an external power supply. Moreover, the wireless charging functionality means that the controller may avoid charging ports, further improving the structural integrity, shock resistance and waterproof characteristics of the controller. Furthermore, providing the power supply in the housing contributes to the compact and modular design of the controller.

In exemplary embodiments, the controller further comprises one or more sensors, each sensor configured to generate respective sensor data, wherein the circuitry is configured to transmit sensor data of the one or more sensors to the external electronic device, and wherein any one or more of the following applies:
    the one or more sensors include one or more of the following: photoplethysmography (PPG) sensor, pressure sensor, temperature sensor, magnetometer, global navigation satellite system (GNSS) sensor, and accelerometer; and
    the one or more sensors are contained in the housing.

Advantageously, the controller can be simultaneously used to monitor a number of characteristics, including heart rate and location. Furthermore, providing the sensors in the housing contributes to the compact and modular design of the controller.

According to a second aspect of the present invention, there is provided a method for remotely controlling an external electronic device using the wearable controller of any preceding claim, comprising:
    accessing, at the controller, a key-map, wherein the key-map is indicative of a predefined relationship between input signals generated by the multi-directional switch and a plurality of predefined actions, wherein the predefined actions are for controlling the external electronic device;
    determining, from the key-map, the predefined actions associated with the generated input signals;
    generating command signals corresponding to the determined predefined actions, wherein the generated command signals are for causing the determined predefined actions to be performed at the external electronic device; and
    transmitting the command signals to the external electronic device.

The method may be computer implemented, e.g. using software modules implemented in the external device and in the controller.

In exemplary embodiments, the method further comprises:
    determining, at the external electronic device, a current context of the external electronic device;
    sending, to the controller, information indicative of the current context of the external electronic device;
    selecting, at the controller, the key-map from a plurality of key-maps based on the information indicative of the current context, wherein each key-map is associated with a different context of the external electronic device, and wherein each key-map is indicative of a predefined relationship between the input signals and a respective plurality of predefined actions;
    determining, at the controller and from the selected key-map, the predefined actions associated with the generated input signals; and
    generating command signals corresponding to the determined predefined actions, wherein the generated command signals are for causing the determined predefined actions to be performed at the external electronic device Advantageously, the controller of the present invention can be used to dynamically control different applications that may be run on the external electronic device, as discussed above. Determining the current context can comprise determining an application or program that is presently running on the external electronic device, wherein the plurality of predefined actions associated with the current context are for controlling said application or program.

In exemplary embodiments, the method further comprises:
    determining, at the external electronic device, a current context of the external electronic device;
    identifying, at the external electronic device, the key-map, wherein the key-map is associated with the current context of the external electronic device; and receiving, at the controller, the key-map from the external electronic device.

According to a third aspect of the present invention, there is provided a system comprising:
    the controller of the first aspect; and
    an external electronic device in wireless communication with the controller,
    wherein the controller is configured to:
        access a key-map, wherein the key-map is indicative of a predefined relationship between input signals generated by the multi-directional switch and a plurality of predefined actions, wherein the predefined actions are for controlling the external electronic device;
        determine, from the key-map, the predefined actions associated with the generated input signals;
        generate command signals corresponding to the determined predefined actions, wherein the generated command signals are for causing the determined predefined actions to be performed at the external electronic device; and
        transmit the command signals to the external electronic device.

According to a fourth aspect of the present invention, there is provided a wearable electronic controller for remotely controlling an external electronic device, comprising:
    a body for securing to a human finger;
    a multi-directional switch comprising: a lever that extends outwardly from an outer surface of the body, and a control unit configured generate input signals in response to manipulation of the lever; and
    circuitry configured to generate command signals based on the input signals, and to wirelessly transmit the command signals to the external electronic device, wherein the generated command signals are for causing respective actions to be performed at the external electronic device.

In exemplary embodiments, the body can include means for attaching a strap thereto. Advantageously, the controller of this aspect can be secured to other body parts (e.g. wrist, ankle, arm etc.) or to objects (e.g. ski poles, bicycle handlebars etc.). In comparison to the first aspect, the shank portion of the body may be omitted in this fourth aspect. However, it will be appreciated that the other features and exemplary embodiments of the first aspect may otherwise apply to this aspect.

According to a fifth aspect of the present invention, there is provided an electronic controller for remotely controlling an external electronic device, comprising:

a housing comprising:
- a multi-directional switch comprising: a lever that extends outwardly from an outer surface of the body, and a control unit configured generate input signals in response to manipulation of the lever; and
- circuitry configured to generate command signals based on the input signals, and to wirelessly transmit the command signals to the external electronic device, wherein the generated command signals are for causing respective actions to be performed at the external electronic device.

The housing is preferably shaped and/or dimensioned to be held within a cavity or compartment of the body of the first and fourth aspects, or otherwise as discussed herein. It will be appreciated that the features and exemplary embodiments of the first and fourth embodiments above concerning the housing and its contents, may also apply to the fifth aspect.

According to a sixth aspect of the present invention, there is provided an electronic controller for remotely controlling an external electronic device, comprising:
- a body for wearing or securing on a human finger;
- a user input means configured generate input signals in response to user input; and
- circuitry configured to generate command signals based on the input signals, and to wirelessly transmit the command signals to the external electronic device, wherein the generated command signals are for causing respective actions to be performed at the external electronic device.

In exemplary embodiments, the user input means is a multi-directional switch.

In exemplary embodiments, the multi-directional switch includes a lever that extends outwardly from an outer surface of the body, and a control unit configured to generate the input signals in response to manipulation of the lever.

In exemplary embodiments, the multidirectional switch includes a plurality of buttons, on an outer surface of the body, and a control unit configured to generate input signals in response to actuation of the buttons.

In exemplary embodiments, the control unit generates a discrete input signal for each one of the buttons.

Other features of the disclosure are described below and recited in the appended claims.

BRIEF DESCRIPTION OF THE DRAWINGS

Embodiments of the present invention are now described with reference to the accompanying drawings, in which.

DETAIL DESCRIPTIONS OF THE INVENTION

Figure 1A:
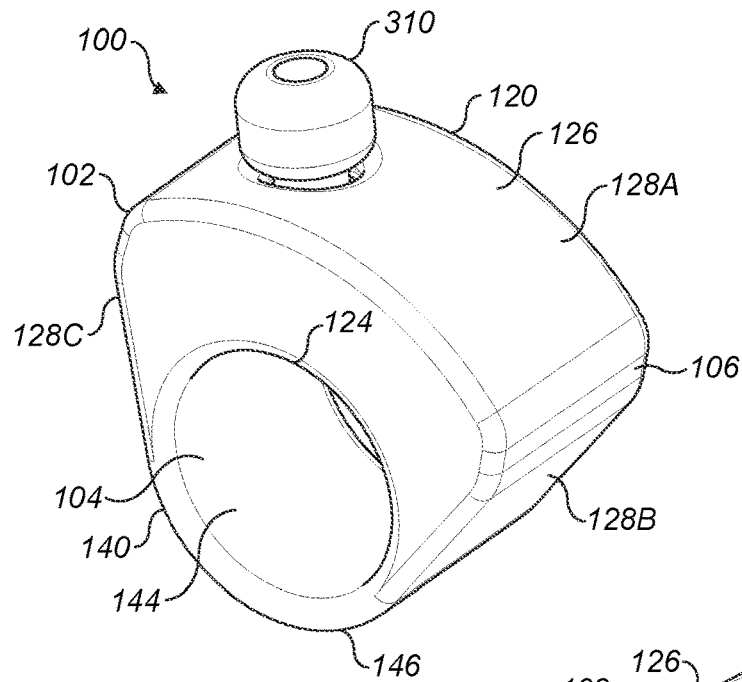
FIG. 1A is a first perspective view of a controller of the present invention.
Figure 1B:
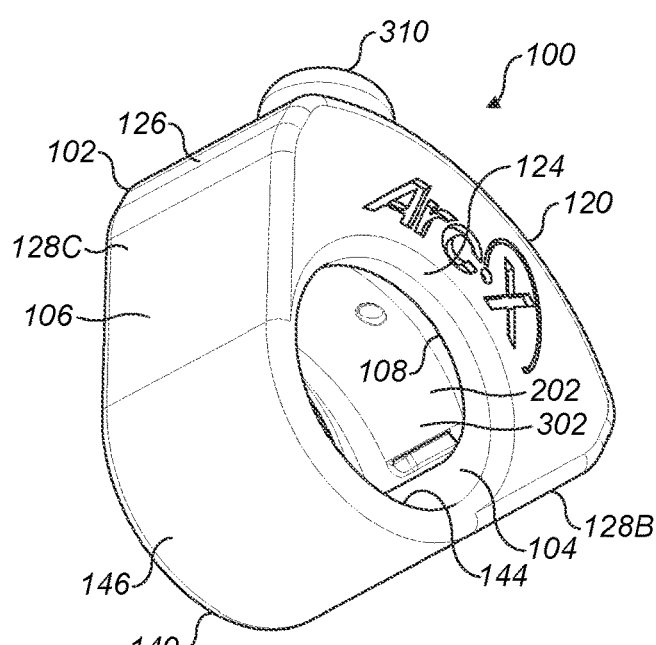
FIG. 1B is a second perspective view of the controller of the present invention.
Figure 1C:
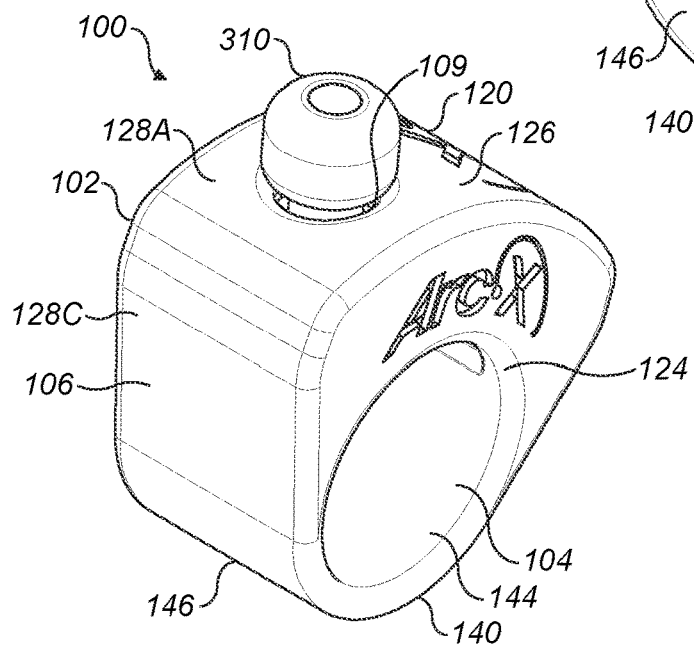
FIG. 1C is a third perspective view of the controller of the present invention.
Figure 1D:
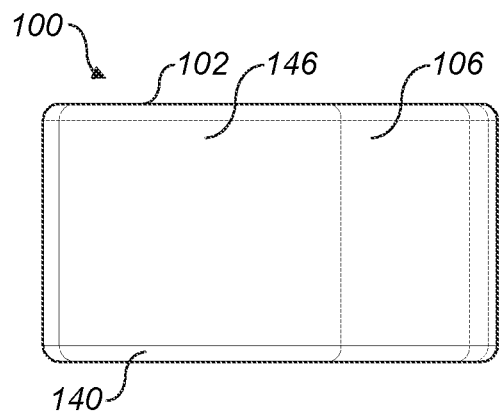
FIG. 1D is a bottom view of the controller of the present invention.
Figure 1E:
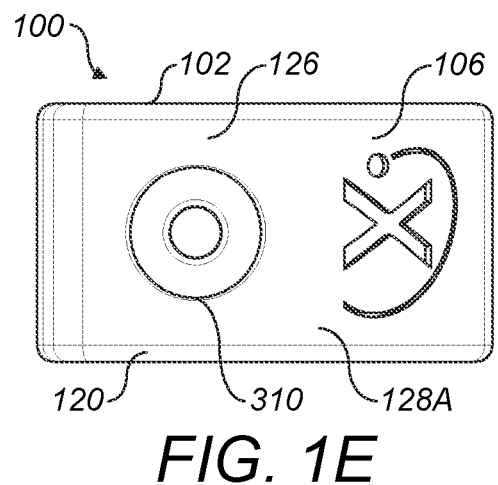
FIG. 1E is a top view of the controller of the present invention.

All illustrations of the drawings are for the purpose of describing selected versions of the present invention and are not intended to limit the scope of the present invention.

The present invention provides a thumb operated, programmable context aware remote controller. The present invention is invented to allow a user to control and utilize a wirelessly connected electronic device. The present invention may be configured to perform predetermined functionalities. For example, the present invention can remotely control music or other media functionality, make a call, control applications, or utilize navigation functionality on a mobile device. In an exemplary embodiment, the present invention is housed in a ring-shaped or semi-circular unit which slips over and is worn on the index finger (also called the "pointer finger") or second finger of either hand. A joystick lever extends outwardly from the unit's housing and is naturally positioned to be easily manipulated by the user's thumb. In some examples, the controller can be configured to also be attached to a handle or handlebar of a piece of sporting apparatus or equipment, again intended for operation by the user's thumb. The context awareness can allow the same joystick of the controller to control different applications that may be run on the electronic device.

Reference is now made to FIGS. 1A-1G which illustrate a wearable electronic controller 100 according to an embodiment of the invention. The controller 100 has a body 102. The body 102 is generally ring-shaped or annular. The body 102 has an inner circumferential surface, i.e. an inner circumference 104. The inner circumference 104 is circular and defines an axis of the body 102. The inner circumference 104 is dimensioned to receive a human finger therethrough so that the body 102 and therefore the controller 100 can be worn on a human finger. The body 102 has an outer surface 106 distanced from the inner circumference 104 in the radial direction. The body 102 has a varying or non-uniform radial thickness between the inner circumference 104 and the outer surface 106. Therefore, the inner circumference 104 and the outer surface 106 are not parallel or concentric. As such, the body 102 may be considered as non-uniform, or as a non-uniform ring. Advantageously, a non-uniform body can provide a more ergonomic controller that is easier to use. In particular, by using a non-uniform body, the joystick lever 212 can be more easily located and manipulated by a user during use. In alternative embodiments however, the body 102 can have a substantially uniform radial thickness between the inner circumference 104 and the outer surface 106 to provide a uniform body.

Preferably, the body 102 is made of a rubber. More preferably, the rubber is a silicon rubber.

The body 102 is formed of a head portion 120 and a shank portion 140. The head portion 120 and the shank portion 140 have respective inner circumference portions 124 and 144, which together define the inner circumference 104 of the body 102.

The head portion 120 and the shank portion 140 also have respective outer surfaces 126 and 146 which together form the outer surface 106 of the body 102. The shank portion 140 has a radial thickness between its inner circumference portion 144 and its outer surface 146. The radial thickness of the shank portion 140 is uniform. Therefore the outer surface 146 and the inner circumference portion 144 are substantially parallel. The head portion 120 has a radial thickness between its inner circumference portion 124 and its outer surface 126. The radial thickness of the head portion 120 varies or is non-uniform, along the length of its inner circumference portion 124. Therefore the outer surface 126 and the inner circumference portion 124 are not parallel. The radial thickness of the shank portion 140 is generally less than the radial thickness(es) of the head portion 120.

The outer surface 126 of the head portion 120 is formed of a main surface 128A and two side surfaces 128B and 128C. The main surface 128A is curved or arcuate. The side surfaces 128B and 128C are relatively straight or flat. The main surface 128A is distanced from the inner circumference portion 124 at a nominal radial thickness at an axis of symmetry S of the body 102. The side surfaces 128B and 128C are provided on either side of the main surface 128A. In particular the side surface 128 extends between a first side of the shank portion 140 and a first side of the main surface 128A. The side surface 128C extends between a second side of the shank portion 140 and a second side of the main surface 128A. The side surfaces 128B and 128C are tangential to the shank portion 140 and/or the inner circumference 104. The radial thickness between the surface 126 and the inner circumference 124 is greater than the nominal thickness, where the main surface 128A meets the side surface 128B, and where the main surface 128A meets the side surface 128C. The side surfaces 128B and 128C then taper towards the shank portion 140 and meet the shank portion 140. The radial thickness of the head portion 120 therefore decreases or tapers to the radial thickness of the shank portion 140 where the head portion 120 and the shank portion 140 meet. As such, the head portion 120 has a first radial thickness at and/or proximal to the axis S. Travelling away from the axis S along the inner circumference portion 124, the radial thickness of the head portion 120 increases where the main surface 128A meets the side surfaces 128B and 128C. Approaching the shank portion 140, the radial thickness of the head portion 120 decreases or tapers to the radial thickness of the shank portion 140 where the head portion 120 and the shank portion 140 meet. As such, the head portion 120 tapers where the head portion 120 and the shank portion 140 meet. The portions of the head portion 120 at/underneath the side surfaces 128B and 128C may be considered as tapering or tangential portions of the head portion 120, because they taper towards the shank portion 140 and are tangential to the shank portion 140. The main surface 128A may have a lesser degree of curvature (or larger radius of curvature) than outer surface 146 of the shank portion 140. In other words, the main surface 128A may be flatter or less curved than the outer surface 146 of the shank portion 140. The main surface 128A may also have a lesser degree of curvature than the inner circumference 104 of the body 102, and/or the inner circumference portions 124 and 144.

The diameter of the inner circumference 104 may be 16-24 mm. Preferably, the diameter is 18 mm-22 mm. More preferably, the diameter is 20 mm. The diameter can also be any one of 16 mm, 18 mm, 20 mm, 22 mm or 24 mm. However, it will be appreciated that any diameter can be used provided that it allows the body to fit on a human finger.

A width of the controller 100 may be 10-30 mm. More specifically, the width may be 15.8-27 mm or 14-17 mm. Preferably, the width is 15.8 mm, 20 mm or 27 mm. A width of approximately 15.8 mm is most preferred.

Figure 1G:
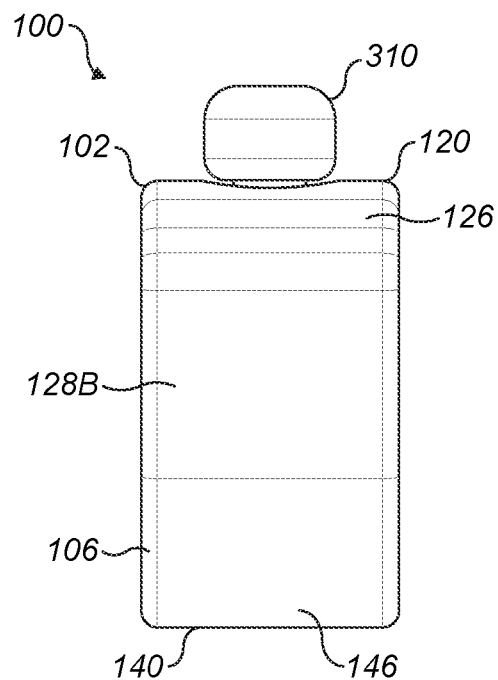
FIG. 1G is a second side view of the controller of the present invention.
Figure 1F:
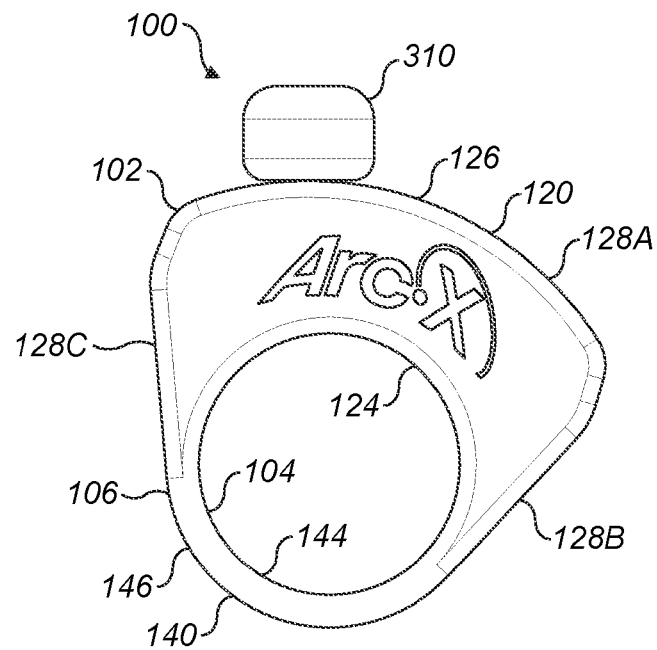
FIG. 1F is a first side view of the controller of the present invention.
Figures 2A, 2B:
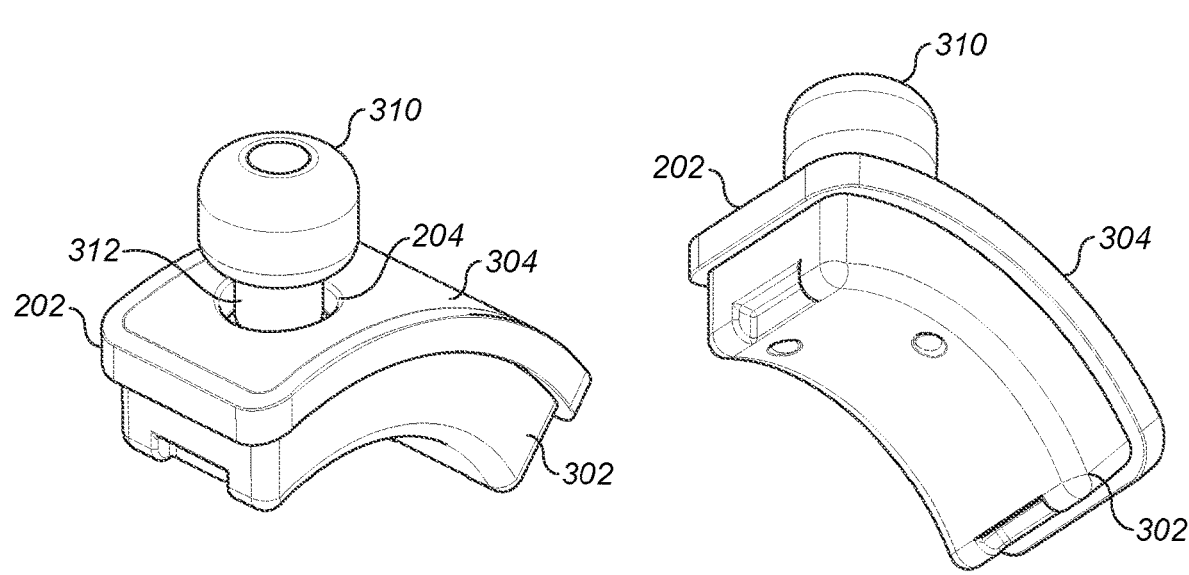
FIG. 2A is a first perspective view of a housing of the controller of the present invention.
FIG. 2B is a second perspective view of a housing of the controller of the present invention.
Figure 2C:
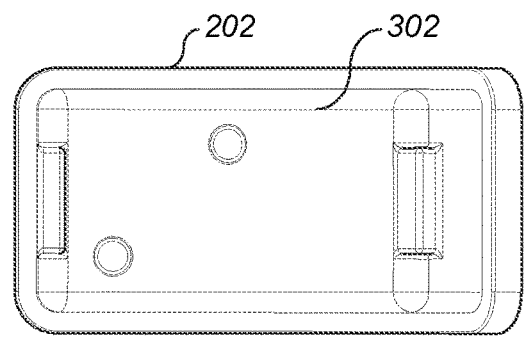
FIG. 2C is a bottom view of a housing of the controller of the present invention.
Figure 2D:
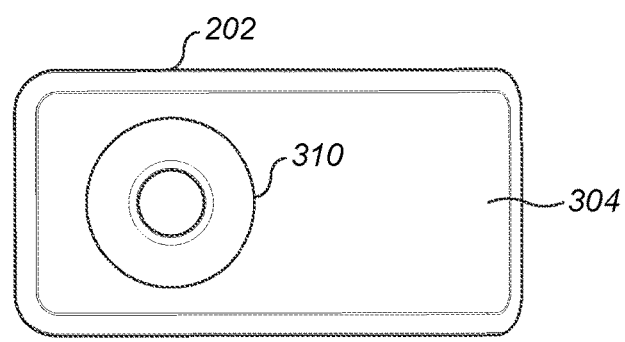
FIG. 2D is a top view of a housing of the controller of the present invention.
Figure 2E:
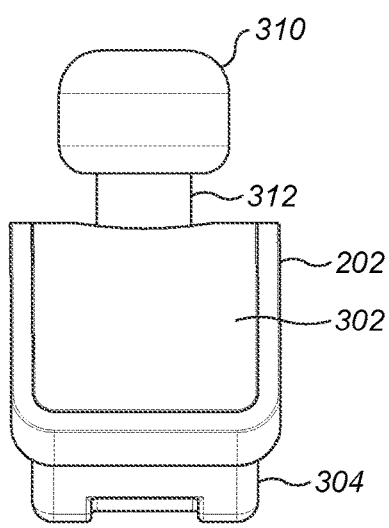
FIG. 2E is a first side view of a housing of the controller of the present invention.
Figure 2F:
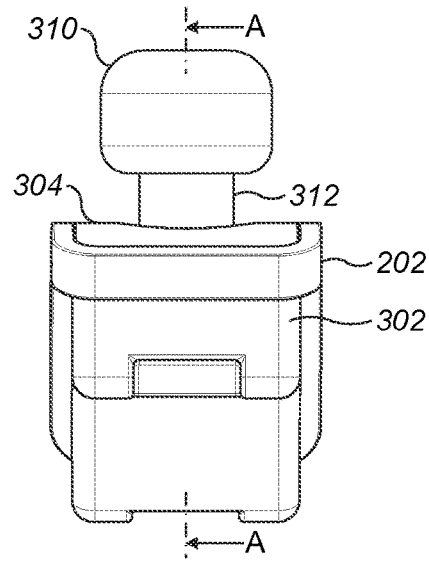
FIG. 2F is a second side view of a housing of the controller of the present invention.
Figure 2G:
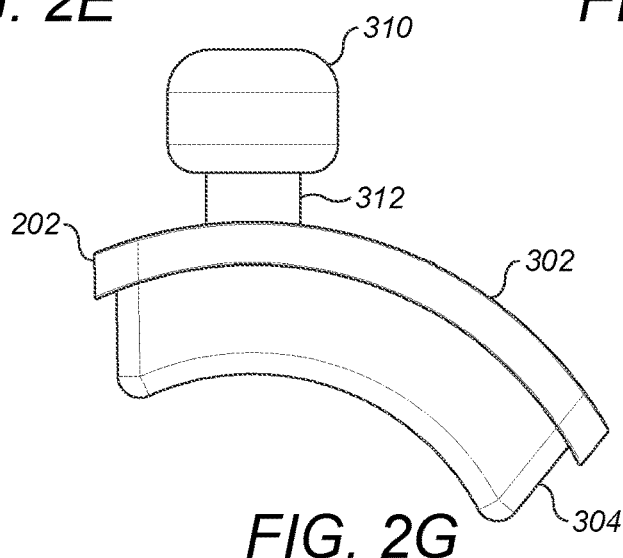
FIG. 2G is a third side view of a housing of the controller of the present invention.
Figure 2H:
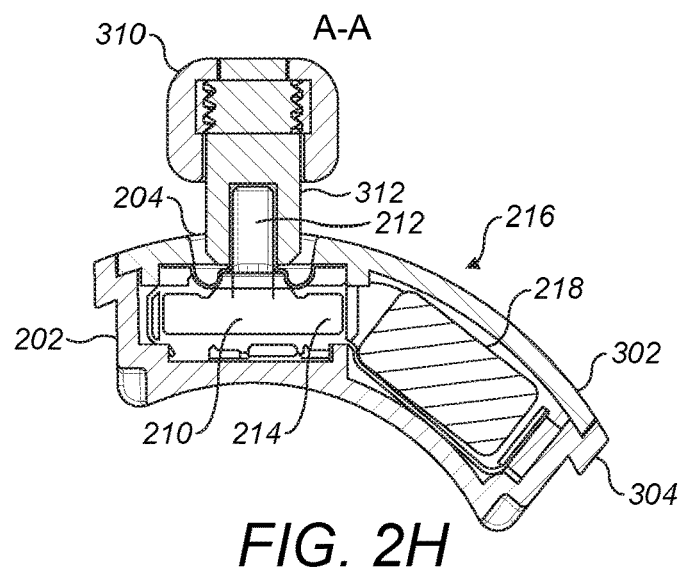
FIG. 2H is a side cross sectional view of a housing of the controller of the present invention.

A height of the controller 100 (e.g. between the lowermost point of the shank portion 140 to the tip of the lever 212 cap 310, as sown in FIG. 1G) may 25-50 mm. More specifically, the height may be 35-45 mm or 36-39 mm. Most preferably, the height is approximately 37.26 mm.

A distance between the sides of the main surface 128A may be 28-35 mm. More specifically, the distance may be 28-33 mm. The distance can be any one of approximately 28.49 mm, 28.86 mm, 30.93 mm 32.9 mm or 34.77 mm. Most preferably, the distance is approximately 30.93 mm.

Preferably, the radial thickness of the shank portion 140 is 1-3 mm. Most preferably, the radial thickness of the shank portion 140 is approximately 2 mm.

The body 102 has a cavity or compartment 108. The cavity 108 is provided in the head portion 120 of the body 102. In particular, the cavity 108 is beneath the outer surface 126 of the head portion 120. The cavity 108 is accessible from the inner circumference portion 124 of the head portion 120 where there is an opening to the cavity 108. The controller 100 includes a housing 202 received and held within the cavity 108. The shape of the housing 202 corresponds to the shape of the cavity 108 such that the housing 202 is a snug fit within the cavity 108. Moreover, the housing 202 is shaped to be flush with the inner circumference 104 of the body 102 when the housing 202 is in the cavity, so as not to obstruct the user's finger when donning or putting on the controller 100.

Figure 3:
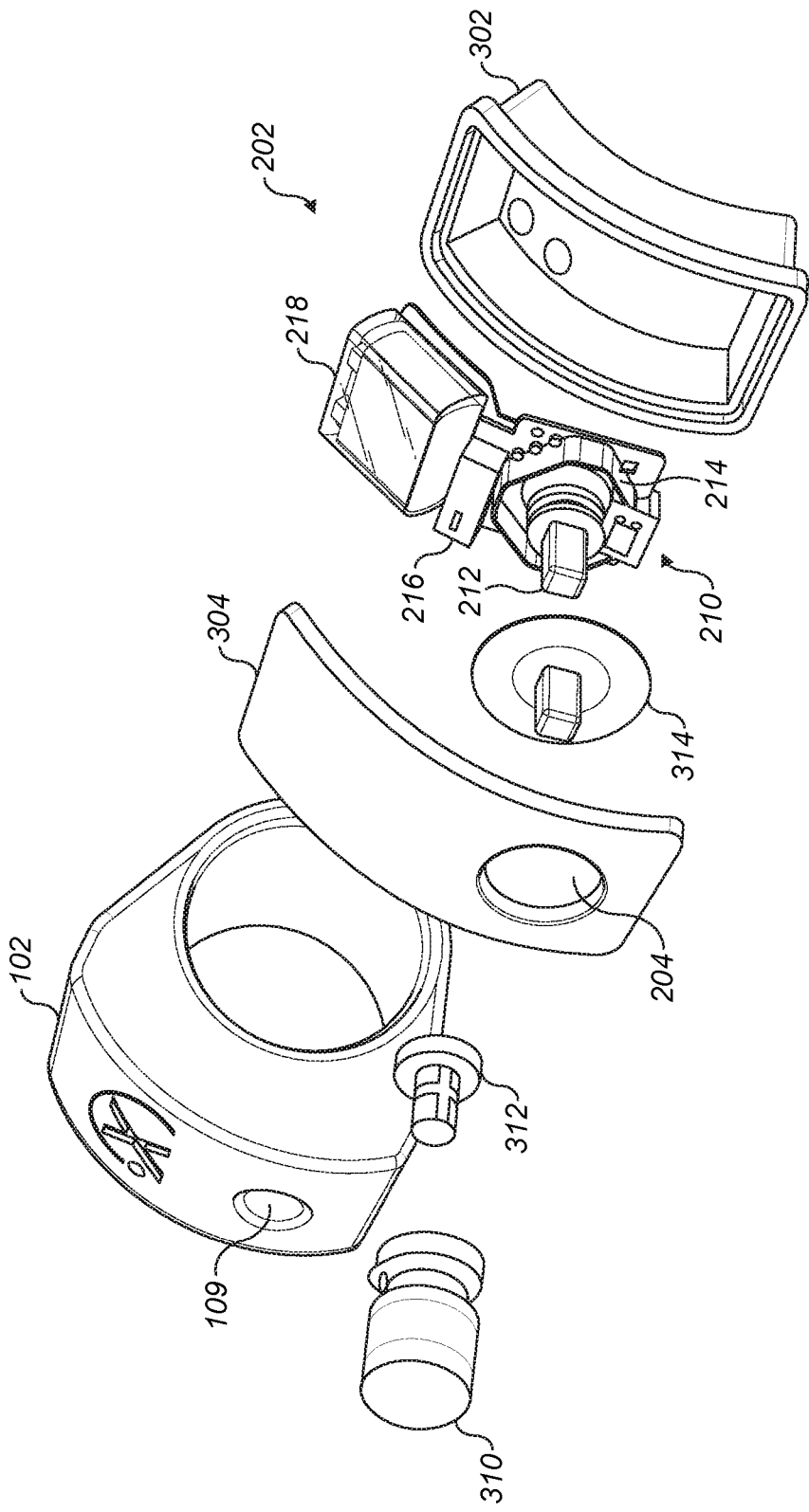
FIG. 3 is an exploded view of the housing and the electronic components of the present invention.

The housing 202 is illustrated in more detail in FIGS. 2A-2H. An exploded view of the housing 202 is also shown in FIG. 3. The housing 202 contains a joystick 210. The joystick 210 may also be considered as a multi-directional switch, or more generally as an actuator. The joystick 210 includes a lever 212 and a base 214. The lever 212 is coupled to the base 214 and extends from the base 214. Moreover, the lever 212 is pivoted at the base 214. The base 214 may be considered as a control unit of the joystick 210. The lever 212 is movable or can be manipulated by a user, e.g. about the pivot. The lever 212 is movable between a number of discrete positions. The base 214 is configured to output a plurality of discrete input signals. In particular, the base 214 outputs a respective discrete input signal corresponding to each discrete position of the lever 212. As such, as the lever 212 is moved or manipulated between the discrete positions, the base 214 outputs the discrete input signal corresponding to the position into which the lever 212 is moved. In a preferred embodiment, the lever 212 is movable between five discrete positions. In particular the lever 212 is preferably moveable between five discrete positions (four orthogonal directions and a downward pressing direction in the longitudinal direction of the lever 212). The base 214 may produce a discrete input signal for each discrete position. In some embodiments, each discrete input signal is a continuous signal. For example, pressing and holding the lever in one of the discrete positions can result in generating a continuous signal stream, e.g. for the duration of the press and hold. Each continuous signal stream corresponds to a respective one of the discrete positions of the lever 212, and therefore each continuous signal stream is discrete or distinct from one another.

The housing 202 also contains circuitry 216. The circuitry 216 is configured to receive the input signals from the joystick 210. The circuitry 216 converts the discrete input signals to discrete command signals. The input signals are mapped to a set of predefined actions for controlling an external electronic device. As such, for each generated input signal, the circuitry 216 generates a command signal according to the predefined action that is mapped to that generated input signal. The generated command signal is able to cause the corresponding predefined action to be performed by the external electronic device when the command signal is received by the external electronic device. As such, when the command signals are received by the external electronic device, then this will result in the corresponding predefined actions being performed at the external electronic device. As described further below, the circuitry 216 can use context awareness to map the input signals to different sets of predefined actions, depending on the current context of the external electronic device (e.g. depending on what application is currently running in the foreground of the external electronic device). For example, different contexts (e.g. different applications) of the external device may respond to different control actions. E.g. a music player application may respond to play/pause/skip/volume control actions, whilst a phone or camera application may not respond to those same control actions. As such, the circuitry 216 can receive information indicative of the context of the external device, and map different sets of actions to the input signals accordingly. As a result, the same discrete movements of the lever 212 may result in different control actions being sent to the external device via the command signals, depending on the current context of the external electronic device. The circuitry 216 is configured to wirelessly transmit the command signals to the external electronic device, so that the generated command signals may control the external electronic device according to the predefined actions mapped to the input signals.

The housing 202 also includes a power supply 218. The power supply 218 supplies electrical power to the circuitry 216. The power supply 218 may also supply power to the joystick 210 so that it may generate the input signals. The power supply 218 includes at least a battery. The battery is preferably a rechargeable battery. More preferably, the battery is a lithium polymer rechargeable battery. The housing 202 may include a wireless charging mechanism for receiving wireless power, and the battery of the invention may be configured to receive power from the wireless charging mechanism to facilitate wireless charging of the battery. Alternatively, the battery can be charged using a wired charging mechanism. The power supply 218 may also include a voltage regulator to regulate the voltage supplied to the circuitry 216 and/or the joystick 210.

Figure 4:
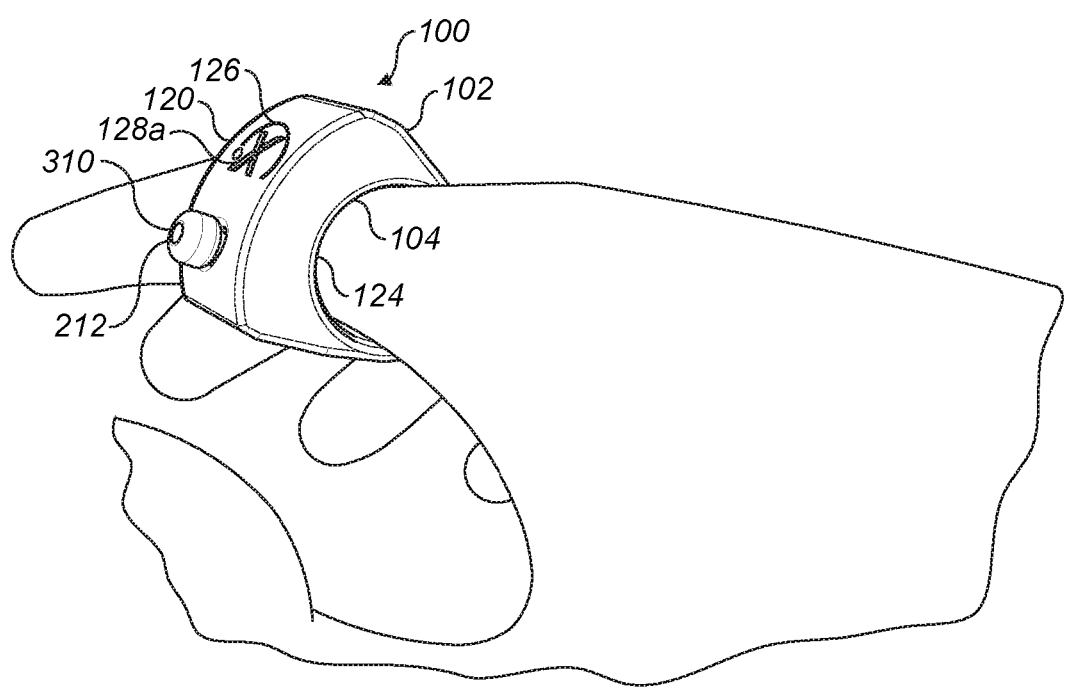
FIG. 4 is illustrating an exemplary usage of the present invention.

The housing 202 includes a hole 204. As shown in FIG. 3, the housing 202 can be formed of a tray or bottom case 302 and a lid or top cover 304. The hole 204 in the housing 202 is formed in the lid 304. The lever 212 extends out of the housing 202 through the hole 204. Furthermore, the outer surface 106 of the body 102 also includes a hole 109. In particular, the hole 109 is positioned in the outer surface 126 of the head portion 120. More particularly, the hole 109 is positioned in the main outer surface 128A of the head portion 120. The holes 109 and 204 are positioned such that the holes 109 and 204 align when the housing 202 is in the cavity 108. As such, the lever 212 also extends through the hole 108, out of the head portion 120 of the body 102. The lever 212 extends from and above the outer surface 128A of the body 102. The lever 212 extends outwardly from the outer surface 128A. Preferably, the lever 212 also extends radially from the outer surface 128A. In some examples, the lever 212 can be considered to extend outwardly at approximately a normal to the surface 128A. In some examples, the lever 212 can be angled relative to the surface 128A normal, or otherwise. The holes 109 and 204 are positioned away from the axis of symmetry S of the body 102. As such, the lever 212 will be positioned away from the axis of symmetry S of the body 102. Reference is made to FIG. 4, which shows the controller 100 worn on a human finger. As shown, the off-centre position of the lever 212 means that the joystick 210 can be more easily accessed and operated by the user's thumb. Moreover, the raised height of the head portion 120 may make it easier for the user to locate the lever 212 when their hands are occupied. Furthermore, the lesser degree of curvature of the surface 128A may also enable the user to more easily locate the lever 212 when otherwise occupied. As such, the controller 100 is ergonomic and provides ease of use to the user.

Preferably, housing 202 is waterproof. In particular, the top cover 304 is secured to the bottom case 302 in a waterproof manner. For example, the top cover 304 can be welded to the bottom case 302 to provide a waterproof seal. In some examples, the top cover 304 is secured to the bottom case 302 via overmolded pogo pins, and/or the top cover 304 is ultrasonically welded to the bottom case 304.

The controller 100 includes a threaded member 312 provided over the lever 212 above the outer surface 126 of the body 102. The controller 100 further includes a joystick cap 310 attached (e.g. screwed) to the end of the threaded member 312. Housing 202 further includes a membrane 314 provided over the lever 212. The threaded member 312, and the cap 310 may be considered as part of the lever 212. The cap 310 preferably has a diameter of approximately 8 mm. The threaded member 312 may have a diameter of approximately 3 mm-4 mm, preferably 3.3 mm. The membrane 314 is welded under the top cover 304, preventing water and dust ingress to the interior of the housing 202 via the hole 204. As such, the membrane 314 can contribute to making the housing 202 waterproof. Preferably, the membrane 314 is a TPU (thermoplastic polyurethane) film.

Figure 5A:
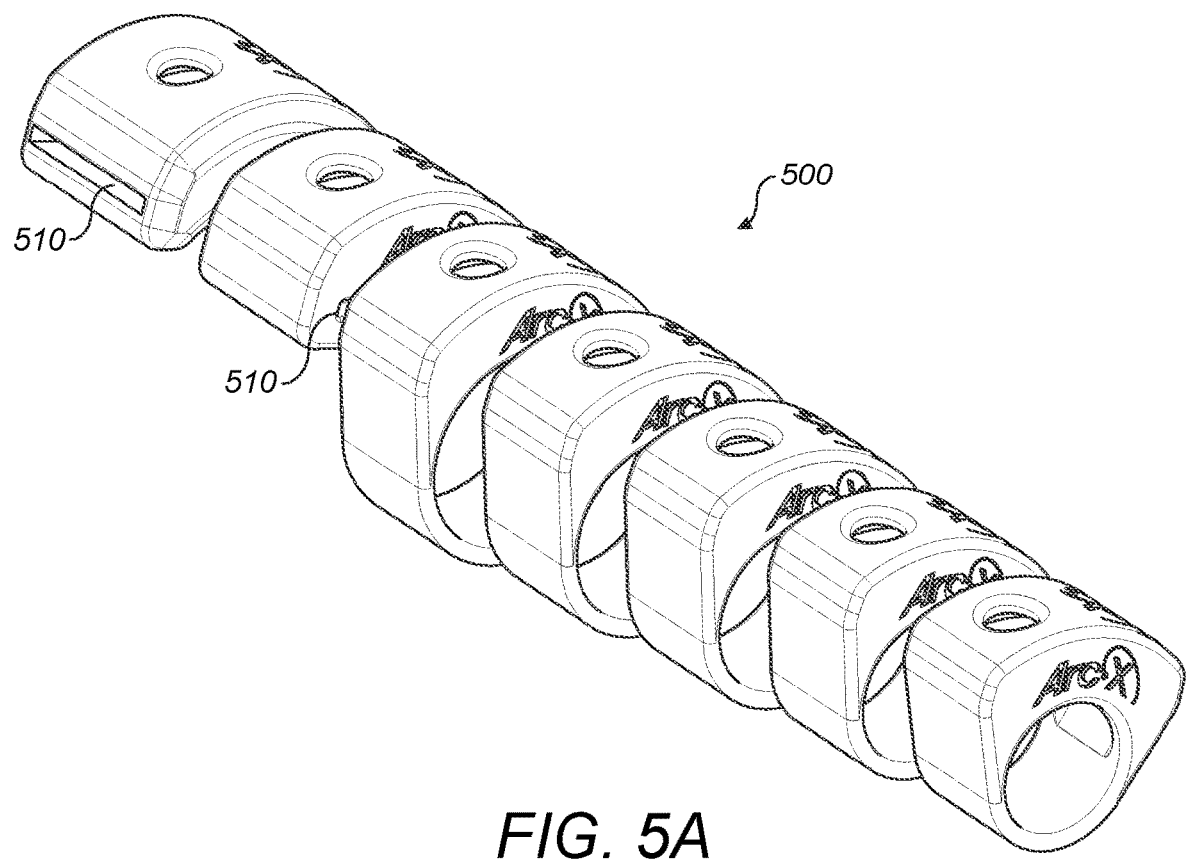
FIGS. 5A-5C illustrate bodies of alternative types, shapes and dimensions for the controller of the present invention.
Figure 5B:
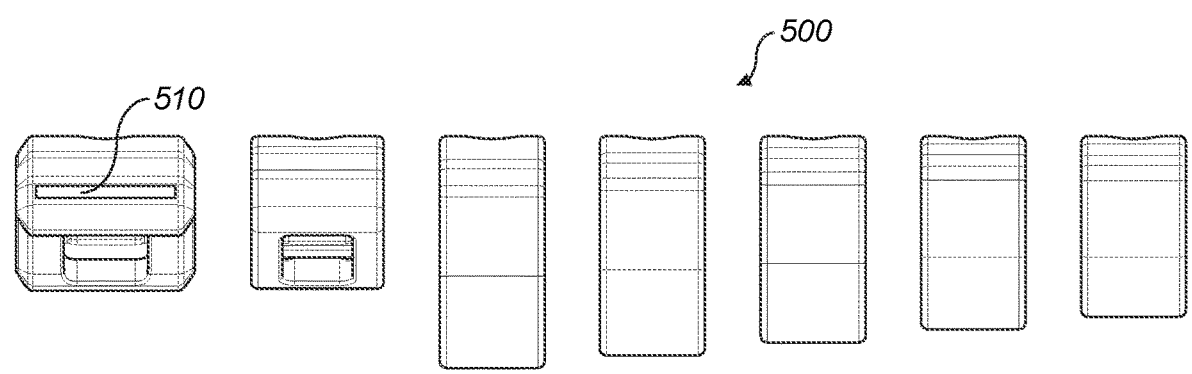
Figure 5C:
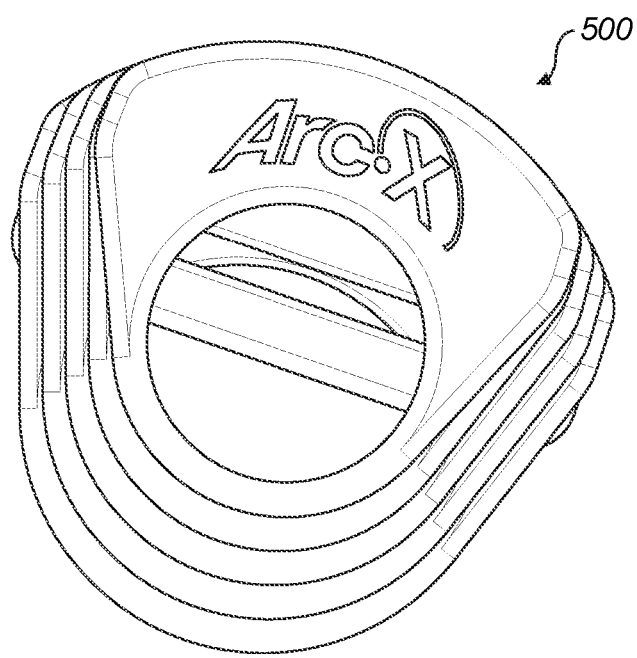

The housing 202 is detachable or releasable from the body 102. The housing 202 and/or the body 102 can include a mechanism for releasably holding the housing 202 within the cavity 102. This can allow the housing, which contains the main circuitry and/or componentry of the controller 100, to be removed from the body 102. Advantageously, the housing 202 can be attached to a different body of the same type as the body 102, e.g. if damage is sustained to the body 102 but the housing 202 and its componentry remains functional. The different body can have the same shape and/or dimensions as the body 102. Alternatively, the different body can be dimensioned differently to the body 102. As such, the housing 202 can be attached to different bodies of different sizes and dimensions, depending on the user's ring size, size preference or otherwise. Examples of different bodies 500 are illustrated in FIGS. 5A-5C. As shown, some of the bodies 500 may correspond in shape and proportion to the body 102, but different in their dimensions or size. Some of the bodies 500 may omit the shank portion 140 (and optionally also the tapered/tangential portions of the head portion 120). In any case, each of the bodies 500 are able to receive the same housing 202 in a cavity or compartment, as described in respect of the body 102.

As mentioned above, some of the bodies 500 may omit the shank portion 140 (and optionally also the tapered/tangential portions of the head portion 120). In some embodiments, the head portion 120 can be attached to a strap so that the controller 100 can be attached to different parts of the body or to objects, such as the wrist, arm, ankle, leg, or to sports equipment such as ski poles, bicycle handlebars etc. For example, the bodies 500 can include means 510 for attaching a strap thereto, which can be used to attach the controller to different parts of the body or to objects.

Figure 6:
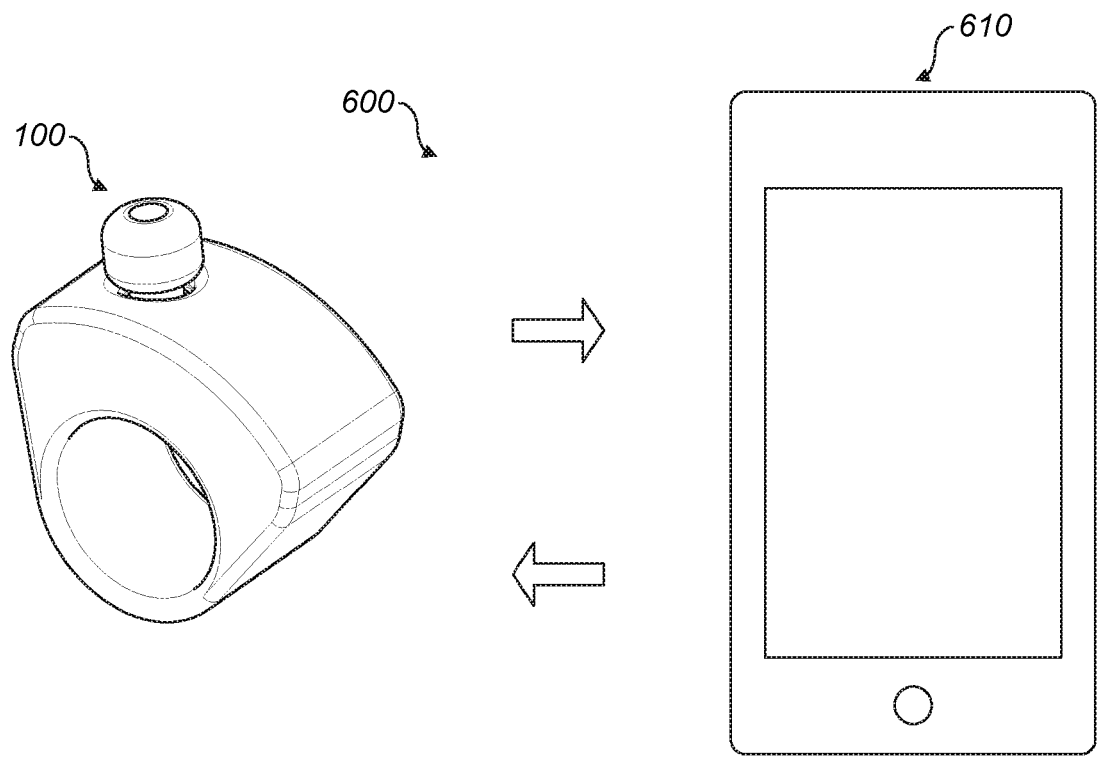
FIG. 6 is illustrating system showing a communication between an external device and the controller of the present invention.

FIG. 6 shows a system 600 including the controller 100 and an external electronic device 610, such as a smartphone or a tablet. The controller 100 is in wireless communication with the external device 610. Therefore the controller 100 is able to wirelessly communicate with and control the external electronic device 610. In general, a user manipulates or moves the lever 212 to one of a number of discrete positions of the joystick 210. The control unit 214 of the joystick 210 generates a discrete input signal corresponding to the discrete position. The circuitry 216 then generates a command signal in response to the input signal. Different input signals (and therefore different discrete positions of the lever 212) are mapped to different actions from a set of predefined control actions to be performed at the external device 610. The generated command signal corresponds to the predefined action that is mapped to the generated input signal (and therefore to the discrete position of the lever 212). The command signal is transmitted to the external device 610 which results in the corresponding action being performed at the external device 610. Different movements of the lever 212 will result in different input signals being generated, and therefore different actions from the set of predefined actions being performed at the external device 610.

Different applications on the device 610 may require different sets of control actions. For example, a music player application may be controlled with start/stop/skip track/volume up or down control actions. A phone application may be controlled with mute/call/hang-up control actions. As such, the same set of predefined actions may not be suitable for all applications that can be used on the device 610. The present invention therefore applies context awareness techniques to dynamically change the set of control actions that is mapped to the joystick 210. As such, as the context of the device 610 changes (e.g. as the user changes which application is being used on the device 610), the control actions mapped to the joystick 210 will update accordingly. The same discrete movements and positions of the lever 212 will result in different command signals being sent to the device 610 according to the updated mapping, and therefore different actions being performed at the device 610. A context of the device 610 may generally refer to a state of the device 610 in which a predefined set of actions can be used to control certain functionality of the device 610.

Figure 7:
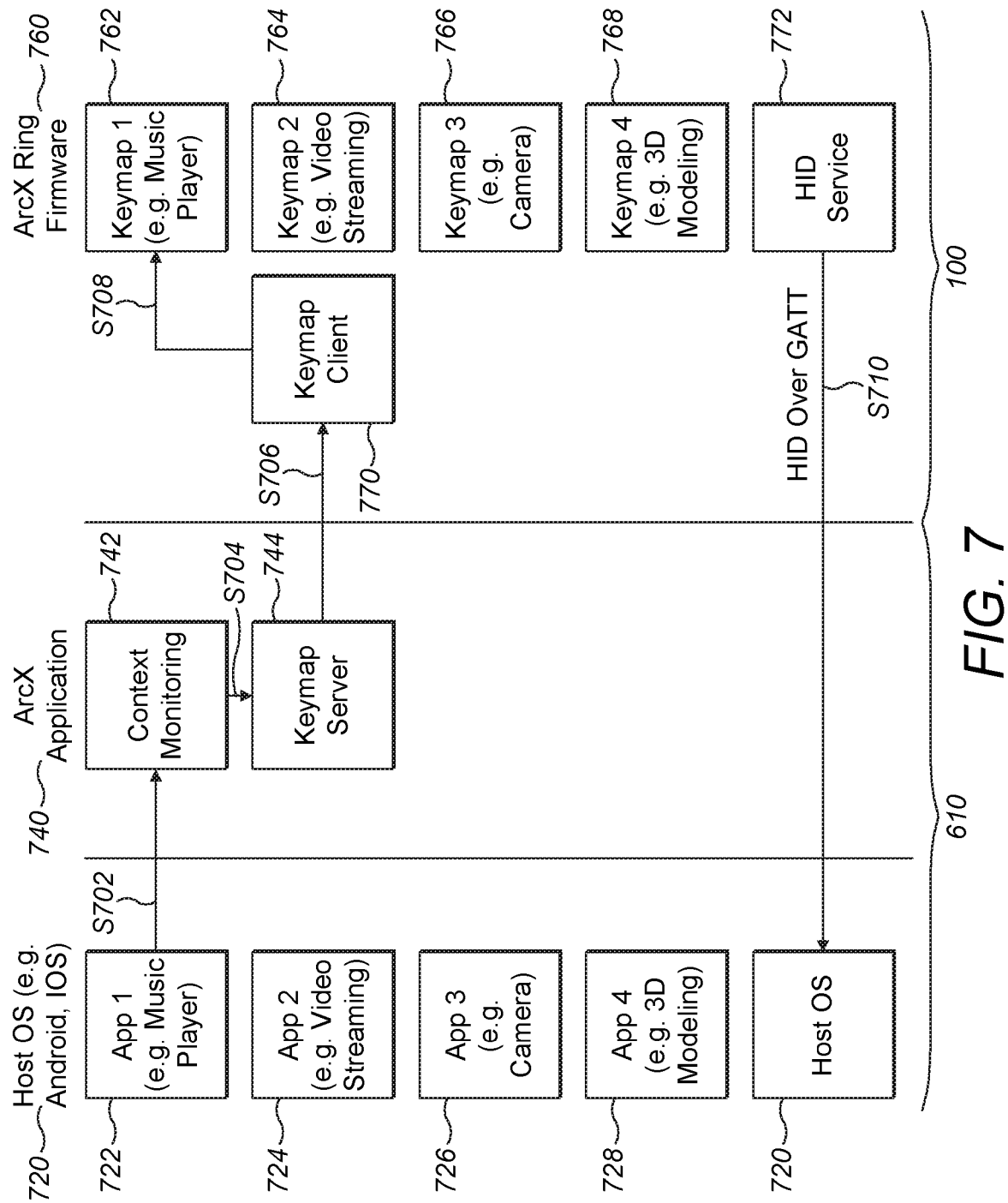
FIG. 7 shows a state diagram illustrating a communication method between an external device and the controller of the present invention.

FIG. 7 illustrates a method of controlling the device 610 with the controller 100 using context awareness techniques, according to an embodiment of the present invention. The external device 610 includes a host operating system (OS) 720. The host OS 720 supports the functioning of the device 610, e.g. by managing the device's 720 hardware and software, as is understood by the skilled person. Where the device 610 is a smartphone or a tablet, the host OS can be Android or iOS. The device 720 also includes a plurality of software applications 722, 724, 726, 728. App 1 722 may be a music playing application who's content is controllable using e.g. play/pause/skip forward/skip backward/volume up/down control actions. App 2 724 may be a video streaming application who's content is controllable using e.g. play/pause/skip forward 15 seconds/skip backward 15 seconds/volume up/down control actions. App 3 726 may be a camera application which is controllable using e.g. take picture/change mode/zoom in/zoom out/shutter speed control actions. App 4 728 may be a 3D modelling application which is controllable using e.g. rotate up/rotate down/rotate left/rotate right/zoom in/out or menu select control actions. As such, each application may be controlled via different sets of control actions. A user can choose which application 722-728 to open and use on the device 610. The host OS 720 is responsible for managing the applications 722-728. Moreover, the host OS 720 manages the communication of control actions and command signals to the applications, from input devices or other means (e.g. human interface devices HID). Four example applications App 1 to App 4 are given but it will be appreciated that any number of applications and different types of applications with controllable content can be present. For example, phone or video call applications may also be present.

The external device 610 also includes a controller application 740. The application 740 may also be hosted and managed by the host OS 720 as described above for the other applications. The application 740 includes a context monitoring module 742 and a keymap server 744. The context monitoring module 742 is configured to determine a context of the device 610. In particular, the context monitor module 742 may determine which application 722-728 is running in the foreground on the device 610 (e.g. which application 722-728 has been opened by a user). The keymap server 744 is configured to identify a keymap associated with the determined application.

The controller 100 includes firmware 760. The firmware 760 includes a keymap client 770, a HID (human interface device) service module 772 and a plurality of keymaps 762, 764, 766, 768. As discussed above, the lever 212 of the joystick 210 is movable between a number of discrete positions (e.g. five positions). The control unit 214 of the joystick 210 outputs a respective input signal for each discrete position. Since only five discrete positions are available, only five different input signals can be generated by the joystick. As such, each keymap 762-768 associates the control actions of a respective one of the applications 722-728 to the set of discrete input signals. The keymap 1 762 associates the available input signals (and therefore the available joystick positions) with the control actions of app 1 722 (e.g. with play/pause/skip forward/skip backward/volume up/down control actions). For example, the input signal corresponding to the downward press of the lever 212 can be associated with play/pause. The right position of the lever 212 can be associated with skip forward. The left position of the lever 212 can be associated with skip backward. The down position of the lever 212 be associated with volume down. The up position of the lever 212 can be associated with volume up. As such, each available input signal is mapped to one or more of the control actions, and therefore each position of the lever 212 is associated with one or more of the control actions. Similarly, the keymap 2 764 associates the available input signals (and therefore the available joystick positions) with the control actions of app 2 724 (e.g. with play/pause/skip forward 15 seconds/skip backward 15 seconds/volume up/down control actions). The keymap 3 766 associates the available input signals (and therefore the available joystick positions) with the control actions of app 3 726 (e.g. with take picture/change mode/zoom in/zoom out/shutter speed control actions). The keymap 4 768 associates the available input signals (and therefore the available joystick positions) with the control actions of app 4 728 (e.g. with rotate up/rotate down/rotate left/rotate right/zoom in/out, or menu select control actions).

The keymap client 770 is configured to receive a keymap identifier from the keymap server 744 (e.g. over wireless communication, using the circuitry 216), and select a corresponding one of the keymaps 762-768. The HID service 772 is configured to generate a command signal based on the selected keymap and an input signal from the joystick 210. In particular, the HID service 772 will receive an input signal from the joystick 210, determine the associated control action based on the selected keymap, and then generate a command signal corresponding to the associated control action. The HID service 772 is further configured to communicate the command signal to the host OS 720 of the external device 610 (e.g. via wireless communication using the circuitry 216). For example, the HID service 772 may communicate with the host OS 720 using HID Over GATT (Generic Attribute Profile) protocols, as can be used for transferring data using Bluetooth low energy. The host OS 720 is further configured to receive the command signals and relay the command signal to the foreground application, so that the associated action is performed in the foreground application.

According to an example method of the present invention, a user may open App 1 722 on the external device 610. The app 1 722 can be controlled using play/pause/skip forward/skip backward/volume up/down control actions. At step S702, the context monitoring module 742 determines the context of the device 610. In particular, the context monitoring module 742 determines that the app 1 722 is running in the foreground of the device 610. At step S704, the keymap server 744 identifies a keymap associated with the app 1 722 (keymap 1 762). The identifier can be a unique keymap number or identifier or otherwise. At step S706, the keymap identifier is sent to the controller 100, e.g. via wireless communication using circuitry 216. At step S708, the keymap client 770 selects the keymap according to the keymap identifier, keymap 1 762. In the meantime a user may move or manipulate the joystick lever 212. The joystick 210 generates an input signal corresponding to the discrete position of the lever 212. At step S710, the HID service module 772 reads the selected keymap 1 762 and determines the control action that is associated with the generated input signal. The module 772 then generates a command signal corresponding to the determined control action and communicates the command signal to the host OS 720 of the device 610, e.g. via wireless communication using circuitry 216. The host OS 720 then processes the command signal and provides the control action to the foreground application app 1 722 which results in the control action being performed in the application app 1 722.

The above example has been given for when the user opens app 1 722 as the foreground application. However, it will be appreciated that a similar process applies for when the user opens any of the other applications 724-728. In particular, different applications 724-728 may result in correspondingly different keymaps being identified by the keymap server 744, different keymaps being selected by the keymap client 770 and therefore different control signals being determined as associated with the lever 212 position.

In some example scenarios, a phone or video call may be received at the external device 610. In such scenario, a phone or video call application may automatically be opened in the foreground of the device 610. The application 740 may detect the automatic change in context of the device 610 and the system may select the corresponding key-map as described above.

As indicated in FIG. 7, in some examples, the keymaps 762-772 are stored in memory in the controller 100. The controller 100 then accesses the keymaps from memory to read the keymap and determine the control action associated with the input signal. In other examples, the keymap server 744 may communicate the keymap itself to the controller 100. For example, the keymap identifier can be the keymap itself. This is useful for implementations where the keymaps are not stored locally on the controller 100.

The controller 100 may be used in a similar way to control the functionality of other types of external device 610, such as music players, speakers and sports cameras.

It will be appreciated that each of the external device 610 and the controller 100 may include any necessary circuitry or components in order to execute the methods described herein. For example, the controller 100 may include one or more processors, a memory and/or a transceiver to facilitate the processing, storing and communicating of information respectively, in order to perform the methods of controlling the external device 610 using the controller 100 as described herein. Said processor(s), memory and transceiver can be considered as part of the circuitry 216. Similarly, the external device 610 may include one or more processors, a memory and/or a transceiver to facilitate the processing, storing and communicating of information respectively, in order to perform the methods of controlling the external device 610 using the controller 100 as described herein.

Further embodiments and implementations of the present invention are described as follows.

In some embodiments and as can be seen at least in FIG. 3, the ring housing 202 encloses a power supply 218 consisting of a battery, optionally a voltage regulator (not shown), circuitry 216 implemented as a Bluetooth communication module which provides a wireless Bluetooth connection to the remote device 610, a micro joystick lever 212 that operates navigation (e.g. controls actions at the external device 610), and optionally a RFID/NFC module that provides additional functionality (not shown). The lever 212 extends outwardly from the exterior of the ring housing where it is directly under and readily movable by the user's thumb as seen in FIG. 4.

The battery is preferably a lithium polymer rechargeable battery that can be recharged by connecting the device to an external battery charger using the recharging pins. As can be seen at least in FIG. 6, the invention can communicate with an external device 610 via a communications link that conforms to the Bluetooth 4.x/5.x standard, chosen in part because it enjoys widespread use across the consumer electronics market and is currently integrated in a wide variety of devices, such as cell phones, smartphones, music players, speakers and sports cameras.

The joystick operated navigation switches 210 may be implemented using tactile switches such as MT5-4LV6 from DAU COMPONENTS LTD or CEN0741-0711M1 from CE COMPONENTS LTD. The switch/joystick provides a multi-directional (e.g. five ways) switch (four orthogonal directions and also a "select" function actuated by pressing downwardly on the joystick). The switch provides a distinctive tactile feel for directional scanning and select functions.

The Bluetooth low energy communications module may be implemented using the nrf52 Series from Nordic Semiconductor, Trondheim, Norway. The Bluetooth module may have an integrated DSP to run at least the context aware event generation engine. The Bluetooth module may be powered using a Lithium Polymer rechargeable battery (e.g. the battery of the power supply 218). The battery may be managed using Li-Ion Linear Battery Charger with LDO STNS01 from ST Microelectronics.

The navigation switches (e.g. the joystick 210) may be directly connected to General Purpose I/O pins of the Bluetooth module. The common terminals of the switches can be connected to a pull-up resistor. The software which resides on and is executed by the Bluetooth chip handles the Bluetooth connections to the other devices (e.g. external device 610) and all the needed communication functions. Additional programmed functions include detecting the activation of the joystick 210 and sending a command to the remote system (e.g. to external device 610) according to an intelligent context aware mapping as described herein.

It will be appreciated that the ring controller 100 of the type described may be used in a rich variety of applications, as illustrated by the following examples: The ring may be used in combination with a menu display visible to a user wherein the directional navigation switches 212 may be used to move a "cursor" (a pointer or a moving highlight) to a particular option, and then pressing the joystick 210 downward to select that option. Control menus of that kind are commonly used on conventional devices, such as program guides for audio players and television sets, and on cellular phones. Audio devices may provide audible prompts to the user which announce available options; for example, the user may use the navigation controller to select from a nested list of options delivered in the same fashion options are presented to callers by some telephone station sets and cellular handsets. Alternatively, the ring controller may be used in combination with devices whose mode of operation is varied in ways that are perceptible to the user. For example, the joystick 212 may be moved up or down to control the audio volume of an audio player or a television set, while right and left motion may be used to switch channels or skip from song to song, forward or backwards. A radio-controlled toy can be steered from left to right by moving the joystick lever from left to right, while the speed of the toy can be controlled by moving the joystick lever forward and backward. In each of these examples, the perceived behavior of the controlled device itself provides the information the user needs in manipulating the ring control to achieve a desired result. Audio devices controlled by the ring controller may create an audio stream that is presented to the user through headphones or speakers (e.g., the items in the current menus are transmitted to the user by associating them to different words that are spoken to the user, 'New SMS', 'Incoming SMS', etc.). These audio and visual prompts may allow navigation through nested menus.

The ring 100 may include a built-in haptic device (such as a miniature loudspeaker in contact with the user's finger or a haptic feedback device for vibrations) which is actuated by a signal received from a remote device 610 via the (e.g. Bluetooth) connection. In this way, the user may receive haptic feedback whose character and intensity provides the user with an indication of the effect achieved when the joystick is manipulated.

In some embodiments, a visual indicator, such as multi-colored LED, may also be built into the ring 100 to provide visual feedback to the user. Thus, for example, an LED may be illuminated when the ring controller 100 has established a communication link with a remote device 610, or when the controlled device 610 assumes a particular state. Preferably this ring 100 can be read by any NFC/RFID reader. As one example, the ring 100 can be read by a NFC/RFID reader on the external device 610 to establish the communication link with the external device 610. The NFC functionality of the controller 100 can be used to provide access control functions (such as locking/unlocking a door) as part of the ring. Alternatively or additionally, the NFC functionality of the controller 100 can be used for authorizing payments using the controller 100, and storing encrypted keys on the controller 100.

In an exemplary embodiment, the micro joystick 210 operates one or more control devices, such as switches or potentiometers, that produce control signals (e.g. the input signals). The wireless communications device 216, such as a Bluetooth module, mounted in the housing 202 transmits command signals to the remote utilization device 610 which are indicative of the motion or position of the micro joystick lever. The command signals sent will be configurable and context aware. A host side API (such as smart phone application 722-728) may send the current context to the finger-worn controller 100. And the finger-worn controller then intelligently interprets the user action and sends the relevant command (e.g. back to the external device 610). The ability to dynamically determine the command to send based on the micro joystick input is novel and unique.

In an exemplary embodiment, the present invention can take the form of a universal attachment that will enable the invention to be securely fixed to piece of sporting or other equipment such as a ski pole, the handle of an indoor rowing machine or cross training machine, a bicycle handlebar, motorcycle handlebar, kayak paddle bar or the crossbar of a stroller for example. The attachment will enable the user to position the present invention on the equipment next to where their hand would naturally grip the equipment that will enable operation of the invention by the user's thumb without the need to remove their hand from the equipment. As one example, the controller 100 can at least omit the shank portion 140, and the head portion 120 can include means 510 for attaching a strap thereto, so that the head portion 120 can be securely fixed to said equipment mentioned above.

Advantageously, using the invention described herein, the user is able to interact with their devices in a spontaneous way. The invention allows the user to focus on their main task, interact with the device when needed and switch back to their original task without having to retrieve the device or hold it in their hand, and thus minimizing the disruption of the main task (e.g., the person can carry a smartphone in their bag or backpack and interact with it using the unit).

In an exemplary embodiment, the predetermined functionality provided by the processor circuit (e.g. circuitry 216) may comprise controlling one or more applications (e.g. applications 722-728) on the external device 610.

In an exemplary embodiment, the present invention may be configured for outdoor environments including but not limited to use in the rain, snow, high-moisture or cold or extreme cold temperature conditions. In this specification, temperatures below –10 degrees Celsius are treated as cold temperatures and –20 degrees Celsius as extreme cold temperatures. In exemplary embodiments, the controller may be configured for use or to operate in hot temperatures, for example up to 50 degrees Celsius. In some exemplary embodiments, the controller may be configured for use or to operate in temperatures up to 40 degrees Celsius. It will be appreciated that the controller may be configured for use or to operate in any other typical temperature range for consumer electronics devices. In exemplary embodiments, a housing 202 of the invention may be partially or fully waterproof preventing water or moisture ingress such that it may operate in wet and humid environments. In exemplary embodiments, the invention may be configured to be rugged and highly tolerant to shock and vibration forces expected in a winter activity such as snowboarding, skiing, ice climbing and the like. In exemplary embodiments, the present invention is configured to allow the user to have access to the mobile device functionalities while comfortably wearing glove(s) as he/she is performing an outdoor winter activity. In such embodiment, the user can secure his/her mobile device in a safe and dry location such as a jacket pocket while performing the previously mentioned activities and functionalities via the invention that is in communication with the mobile device.

In an exemplary embodiment, the present invention may wirelessly communicate with a mobile device 610 and allow a user to remotely control the mobile device's media functionality. For example, in such embodiment, the user may be listening to music via either wired or wireless headphones connected to the mobile device and utilize the present invention to remotely switch tracks or adjust volume, e.g. using the techniques as discussed herein.

In an exemplary embodiment, the ring controller 100 may emit context-aware events, depending on the applications running in the remote systems 610, such that the events are customized per application (e.g. applications 722-728). The context-aware application 740 may monitor the remote system 610 or user behavior, provide the context status to the ring controller 100, which subsequently may choose the appropriate event profile from the list of predefined profiles (e.g. keymaps 762-772). As a result, the joystick 210 moves will emit different events depending on the active application running in the remote systems 610. The predefined profiles may be stored in the ring controller 100 persistent memory or transferred from the context-aware monitor 740 in a dynamic fashion, upon detection of context change.

In an exemplary embodiment, the invention may facilitate the user to remotely perform phone functionalities such as making a call, answering a call, rejecting a call, speed-dialing or selecting and calling a phone contact or making a SOS call to emergency services, e.g. using the techniques discussed herein.

In an exemplary embodiment, the battery of the invention may be configured to support a wireless charging mechanism to facilitate wireless charging.

In an exemplary embodiment, the present invention may be configured to receive and perform a software update that is known in the art as over-the-air (OTA) update. OTA facilitates the wearable device 100 to update its computer-readable code (software). OTA provides the ability to modify the procedures (algorithms) and data inside the invention to be reconfigured to modify existing functionalities or add previously non-existing functionalities to the portable electronic device. The OTA functionality may be facilitated by a wired or wireless connection of the invention to a mobile phone or a computer.

In an exemplary embodiment, the present invention may be configured to transfer any data to and from a connected device (such as a mobile device, e.g. 610) using a wired or wireless (e.g., Bluetooth®) connection.

In an exemplary embodiment, the present invention may be configured to acquire and store data from its various sensors and subsequently transfer this data to another connected device (such as a mobile device, e.g. device 610) using a wired or wireless connection. Similarly, the mobile device 610 of the user may be configured to acquire and store the data from its various sensors and subsequently transfer this data to the invention using a wired or wireless connection. The data from the invention and the secondary connected device (e.g., mobile device 610) may be used in various ways to facilitate predetermined functionalities.

In an exemplary embodiment, the present invention may be provided a universal attachment mechanism configured to detachably couple the invention to a user's object or equipment such as a ski pole or a bi-cycle handlebar, e.g. as described herein.

In an exemplary embodiment, the present invention may include one or more of the following: accelerometer, which may provide three-dimensional acceleration information, positioning chip and module (e.g. a global navigation satellite system, GNSS, chip/module) which may provide real-time location and time information, pressure sensor which may provide altitude information, temperature sensor, magnetometer which may provide magnetic field direction information. The ring controller 100 may also include one or more Photoplethysmography sensors to measure heart rate and other markers such as Heart rate variation. Combining heart rate variation along with the listeners performance such as cadence and pace and utilising other sensors namely GNSS (e.g. GPS) and accelerometers the ArcX application (e.g. 740) may provide tailored physical performance training advice. Preferably, the included sensor(s) are housed in the housing 202.

In accordance with an exemplary embodiment, various aspects and features may be realized in hardware and software or a combination of hardware and software and not limited to methods described. The electronics may include other modules than specified in the Figures and in writing.

Although the invention has been explained in relation to its exemplary embodiments, it is to be understood that many other possible modifications and variations can be made without departing from the spirit and scope of the invention.

Although various physical dimensions and sizings have been given herein for the purposes of this description, it will be appreciated that the scope of this disclosure is not limited as such, and any other appropriate dimensions may be used to implement the present invention.

In some embodiments, other types of multi-directional switches can be used instead of a joystick. For example, the multi-directional switch can include a plurality of buttons, on an outer surface of the body, instead of the lever 212. The control unit 214 may be configured to generate the input signals in response to actuation of the buttons. In particular the control unit may generate a discrete input signal for each one of the buttons. The input signals may be processed as already discussed herein. The surface 128A and the top cover 304 may include a pair of aligned holes for each button. Each button can extend outwardly from the housing 202 through the holes to enable the removeable housing design. Alternatively, the housing may not be removable.

The invention claimed is:

1. A wearable electronic controller for remotely controlling an external electronic device, comprising:
 a body configured to fit on a human finger, wherein the body is annular;
 a multi-directional switch comprising: a lever that extends outwardly from an outer surface of the body, and a control unit configured to generate input signals in response to manipulation of the lever;
 circuitry configured to generate command signals based on the input signals, and to wirelessly transmit the command signals to the external electronic device, wherein the generated command signals are for causing respective actions to be performed at the external electronic device; and
a power supply unit configured to power at least the circuitry;
wherein the body comprises a housing containing the multi-directional switch, the circuitry, and the power supply;
wherein the housing encloses the control unit of the multi-directional switch, the circuitry, and the power supply; and
wherein the housing, including the multi-directional switch, the circuitry, and the power supply contained therein, is removable or detachable from the body.

2. The controller of claim 1, wherein:
the lever extends outwardly from the housing; and
the body comprises a cavity or compartment accessible from an inner circumference of the body for receiving the housing, and a hole in the outer surface of the body, the hole being positioned to receive the lever therethrough when the housing is received in the cavity, such that the lever extends above the outer surface of the body when the housing is in the cavity,
wherein the housing and/or the body comprises a mechanism configured to releasably hold the housing within the cavity,
wherein the shape of the housing corresponds to the shape of the cavity such that the housing is a snug fit within the cavity and is flush with the inner circumference of the body when the housing is in the cavity.

3. The controller of claim 1, wherein the housing is configured to be at least partially waterproof, to protect at least the circuitry from water ingress.

4. The controller of claim 1, wherein the lever is movable between a plurality of discrete positions, and the control unit is configured to generate an input signal for each discrete position.

5. The controller of claim 1, wherein the circuitry is configured to generate the command signals by:
accessing a key-map, wherein the key-map is indicative of a predefined relationship between the input signals and a plurality of predefined actions, wherein the predefined actions are for controlling the external electronic device;
determining, from the key-map, the predefined actions associated with the generated input signals; and
generating command signals corresponding to the determined predefined actions, wherein the generated command signals are for causing the determined predefined actions to be performed at the external electronic device.

6. The controller of claim 5, wherein the circuitry is configured to:
receive, from the external electronic device, information indicative of a current context of the external electronic device;
select the key-map from a plurality of key-maps based on the information indicative of the current context, wherein each key-map is associated with a different context of the external electronic device, and wherein each key-map is indicative of a predefined relationship between the input signals and a respective plurality of predefined actions;
determine, from the selected key-map, the predefined actions associated with the generated input signals; and
generate command signals corresponding to the determined predefined actions, wherein the generated command signals are for causing the determined predefined actions to be performed at the external electronic device.

7. The controller of claim 5, wherein the circuitry is configured to receive the key-map from the external electronic device.

8. The controller of claim 1, wherein the body comprises a head portion and a shank portion that together define an inner circumference of the body, wherein the head portion and the shank portion differ in shape, wherein the lever extends outwardly from an outer surface of the head portion.

9. The controller of claim 8, wherein the head portion has at least a first radial thickness between the inner circumference and the outer surface of the head portion, and the shank portion has a second radial thickness between the inner circumference and an outer surface of the shank portion, wherein the first radial thickness is greater than the second radial thickness.

10. The controller of claim 8, wherein the outer surface of the head portion has a lesser degree of curvature than an outer surface of the shank portion.

11. The controller of claim 8, wherein the head portion comprises an axis of symmetry, wherein the lever extends from the outer surface of the head portion at a location away from the axis of symmetry.

12. The controller of claim 8, wherein the head portion comprises the housing and wherein the head portion comprises a cavity for receiving the housing.

13. The controller of claim 1, wherein the body is made of rubber, wherein the rubber is a silicon rubber.

14. The controller of claim 1,
wherein at least one or more of the following applies:
the power supply comprises a rechargeable battery; or
the housing contains means for receiving power to wirelessly charge the battery.

15. The controller of claim 1, further comprising one or more sensors, each sensor configured to generate respective sensor data, wherein the circuitry is configured to transmit sensor data of the one or more sensors to the external electronic device, and wherein at least one or more of the following applies:
the one or more sensors include one or more of the following: photoplethysmography (PPG) sensor, pressure sensor, temperature sensor, magnetometer, global navigation satellite system (GNSS) sensor, and accelerometer; or
the one or more sensors are contained in the housing.

16. The controller of claim 1, wherein the housing comprises a bottom case and a top cover which is secured to the bottom case to enclose the control unit, the circuitry and the power supply.

17. A wearable electronic system comprising:
a controller comprising:
a body configured to fit on a human finger, wherein the body is annular:
a multi-directional switch comprising: a lever that extends outwardly from an outer surface of the body, and a control unit configured to generate input signals in response to manipulation of the lever;
circuitry configured to generate command signals based on the input signals, and to wirelessly transmit the command signals to the external electronic device, wherein the generated command signals are for causing respective actions to be performed at the external electronic device; and a power supply unit configured to power at least the circuitry;

wherein the body comprises a housing containing the multi-directional switch, the circuitry, and the power supply;

wherein the housing encloses the control unit of the multi-directional switch, the circuitry, and the power supply; and wherein the housing, including the multi-directional switch, the circuitry, and the power supply contained therein, is removable or detachable from the body; and an external electronic device in wireless communication with the controller, wherein the controller is configured to:

access a key-map, wherein the key-map is indicative of a predefined relationship between input signals generated by a multi-directional switch and a plurality of predefined actions, wherein the predefined actions are for controlling the external electronic device;

determine, from the key-map, the predefined actions associated with the generated input signals;

generate command signals corresponding to the determined predefined actions, wherein the generated command signals are for causing the determined predefined actions to be performed at the external electronic device; and transmit the command signals to the external electronic device.

18. A wearable electronic system comprising:

a multi-directional switch comprising: a lever that extends outwardly from an outer surface of the housing, and a control unit configured generate input signals in response to manipulation of the lever;

circuitry configured to generate command signals based on the input signals, and to wirelessly transmit the command signals to the external electronic device, wherein the generated command signals are for causing respective actions to be performed at the external electronic device; and a power supply unit configured to power at least the circuitry;

a housing containing the multi-directional switch, the circuitry, and the power supply and enclosing the control unit of the multi-directional switch, the circuitry, and the power supply;

a first body configured to fit on a human finger, wherein the first body is annular; and a second body which is dimensioned differently to the first body;

wherein the first and second bodies each comprise a cavity for removably or detachably receiving the housing, such that the housing, including the multi-directional switch, the circuitry, and the power supply contained therein, can be interchanged between the first and second bodies.

19. The wearable electronic system of claim 18, wherein the first body has a first inner circumference which is dimensioned to receive a human finger of a first ring size, and wherein the second body is annular and configured to fit on a human finger and has a second inner circumference which is dimensioned to receive a human finger of a second ring size, wherein the second ring size is different to the first ring size.

20. The wearable electronic system of claim 18, wherein the second body has a slot for attaching a strap thereto.

* * * * *